United States Patent
Brown et al.

(10) Patent No.: US 11,799,526 B2
(45) Date of Patent: Oct. 24, 2023

(54) METHOD AND APPARATUS FOR TRANSMITTING A CSI REPORT CONTAINING COEFFICIENTS

(71) Applicant: Lenovo (Singapore) Pte. Ltd., New Tech Park (SG)

(72) Inventors: Tyler Brown, Lake Zurich, IL (US); Udar Mittal, Rolling Meadows, IL (US); Ahmed Hindy, Forest Park, IL (US)

(73) Assignee: Lenovo (Singapore) Pte. Ltd., New Tech Park (SG)

( * ) Notice: Subject to any disclaimer, the term of this patent is extended or adjusted under 35 U.S.C. 154(b) by 0 days.

(21) Appl. No.: 17/764,177

(22) PCT Filed: Oct. 27, 2020

(86) PCT No.: PCT/IB2020/060040
§ 371 (c)(1),
(2) Date: Mar. 26, 2022

(87) PCT Pub. No.: WO2021/090109
PCT Pub. Date: May 14, 2021

(65) Prior Publication Data
US 2022/0368386 A1    Nov. 17, 2022

Related U.S. Application Data (60) Provisional application No. 62/932,353, filed on Nov. 7, 2019.

(51) Int. Cl.
*H04B 7/06* (2006.01)
*H04B 7/0456* (2017.01)

(52) U.S. Cl.
CPC ......... *H04B 7/0478* (2013.01); *H04B 7/0626* (2013.01); *H04B 7/0634* (2013.01)

(58) Field of Classification Search
CPC . H04B 7/04; H04B 7/06; H04B 7/065; H04B 7/0456; H04B 7/0478; H04B 7/0626; H04B 7/0634; H04B 7/0663; H04W 24/10; H04W 72/02; H04W 72/04
USPC .......................... 375/219, 260, 267, 295, 316
See application file for complete search history.

(56) References Cited

U.S. PATENT DOCUMENTS

2022/0263552 A1* 8/2022 Hao ..................... H04B 7/0626

OTHER PUBLICATIONS

Ericsson, "On CSI enhancements for MU-MIMO", 3GPP TSG-RAN WG1#98; R1-1909523, Prague, Czech Republic, Aug. 26-30, 2019.

* cited by examiner

*Primary Examiner* — Shawkat M Ali
(74) *Attorney, Agent, or Firm* — Loppnow & Chapa; Matthew C. Loppnow (57) ABSTRACT

A codebook subset restriction configuration can be received (410) from a network entity. A set of reference signals can be received (420) from the network entity. A set of frequency domain coefficients can be defined (430). The set of frequency domain coefficients can be an element of a discrete Fourier transform-compression codebook. The set of frequency domain coefficients can be generated (440) based on at least the restriction of the function of the amplitude restriction ratio of each beam in the set of restricted beams. At least one channel state information report containing the set of frequency domain coefficients can be transmitted (450).

16 Claims, 5 Drawing Sheets

METHOD AND APPARATUS FOR TRANSMITTING A CSI REPORT CONTAINING COEFFICIENTS

BACKGROUND

1. Field

The present disclosure is directed to a method and apparatus for transmitting a Channel State Information (CSI) report containing coefficients.

2. Introduction

Presently, wireless communication devices, such as User Equipment (UE), communicate with other communication devices using wireless signals over cellular wireless networks. A fundamental limitation on the performance of cellular wireless networks is intercell interference. Intercell interference occurs when transmissions to a UE device in one cell are received by UE devices in other nearby cells. Intercell interference is typically strongest at the edge of a cell since the distance to the nearest interfering network entity, such as a gNB, and therefore the path loss, is lowest at points on the boundary between two cells. One established technique for minimizing cell-edge intercell interference is the use of mechanically down-tilted gNB antennas. Downtilting focuses a gNB's transmitted power in a smaller geographic area which reduces the received power both for devices in its own cell as well as the intercell interference experienced by UEs in adjacent cells. In terms of overall cell edge performance however the reduction in intercell interference more than outweighs the reduction in signal power experienced by UE devices being served by the gNB.

BRIEF DESCRIPTION OF THE DRAWINGS

In order to describe the manner in which advantages and features of the disclosure can be obtained, a description of the disclosure is rendered by reference to specific embodiments thereof which are illustrated in the appended drawings. These drawings depict only example embodiments of the disclosure and are not therefore to be considered to be limiting of its scope. The drawings may have been simplified for clarity and are not necessarily drawn to scale.

DETAILED DESCRIPTION

Embodiments provide a method and apparatus for transmitting a CSI report containing coefficients. Embodiments can provide for codebook subset restriction for DFT-compression CSI feedback. According to a possible embodiment, a codebook subset restriction configuration can be received from a network entity. A set of reference signals can be received from the network entity. A set of FD coefficients can be defined. The set of FD coefficients can be an element of a DFT-compression codebook. The set of FD coefficients can be generated based on at least the restriction of the function of the amplitude restriction ratio of each beam in the set of restricted beams. At least one CSI report containing the set of FD coefficients can be transmitted.

Figure 1:
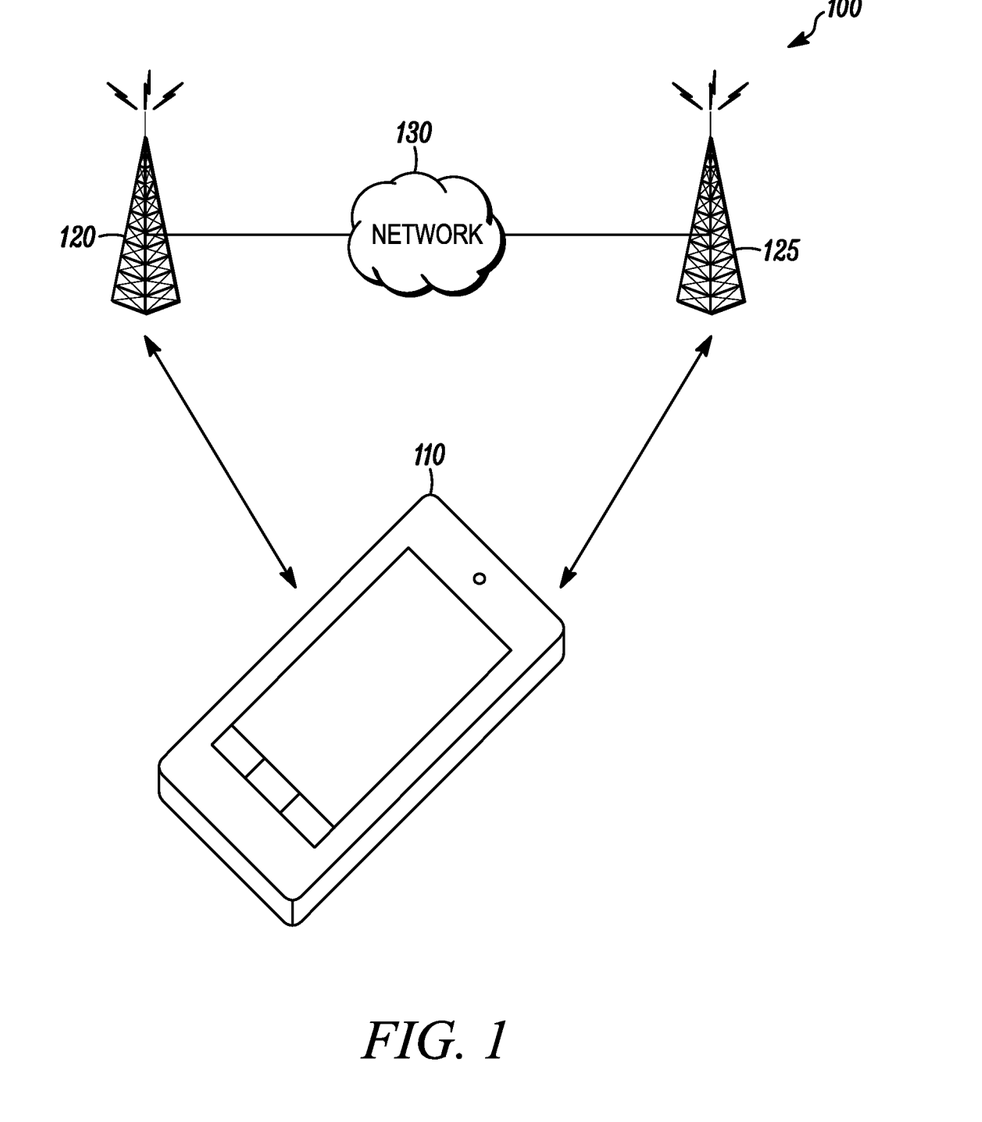
FIG. 1 is an example block diagram of a system according to a possible embodiment.

FIG. 1 is an example block diagram of a system 100 according to a possible embodiment. The system 100 can include a UE 110, at least one network entity 120 and 125, and a network 130. The UE 110 can be a wireless wide area network device, a user device, a wireless terminal, a portable wireless communication device, a smartphone, a cellular telephone, a flip phone, a personal digital assistant, a smartwatch, a personal computer, a tablet computer, a laptop computer, a selective call receiver, an Internet of Things (IoT) device, or any other user device that is capable of sending and receiving communication signals on a wireless network. The at least one network entity 120 and 125 can be a wireless wide area network base station, can be a NodeB, can be an enhanced NodeB (eNB), can be a New Radio (NR) NodeB (gNB), such as a Fifth Generation (5G) NodeB, can be an unlicensed network base station, can be an access point, can be a base station controller, can be a network controller, can be a Transmission and Reception Point (TRP), can be a different type of network entity from the other network entity, and/or can be any other network entity that can provide wireless access between a UE and a network.

The network 130 can include any type of network that is capable of sending and receiving wireless communication signals. For example, the network 130 can include a wireless communication network, a cellular telephone network, a Time Division Multiple Access (TDMA)-based network, a Code Division Multiple Access (CDMA)-based network, an Orthogonal Frequency Division Multiple Access (OFDMA)-based network, a Long Term Evolution (LTE) network, a NR network, a 3rd Generation Partnership Project (3GPP)-based network, a 5G network, a satellite communications network, a high altitude platform network, the Internet, and/or other communications networks.

In operation, the UE 110 can communicate with the network 130 via at least one network entity 120. For example, the UE 110 can send and receive control signals on a control channel and user data signals on a data channel.

With the advent of two-dimensional antenna arrays with electrically steerable beams and, more generally, two-dimensional precoding, other techniques for reducing intercell interference can be used. One such technique, termed Codebook Subset Restriction (CBSR), is based on restricting the mobiles device's selection of precoding matrix from the precoding codebook such that the power in directions associated with high intercell interference is constrained to be less than a set of configured thresholds. The selected precoding matrix is fed back to one or more gNBs as part of the UE device's Channel State Information (CSI) feedback. In Third Generation Partnership Project (3GPP) New Radio (NR) systems, the codebook consists of a set of precoding matrices with each column of the precoding matrix corresponding to a linear combination of spatial basis vectors. The fed back precoding matrices correspond to the linear combining coefficients as well as a set of selected beams. A spatial basis vector will be defined in detail below but can be described as a combination of a Two-Dimensional Discrete Fourier Transform (2D DFT) vector and one of two polarizations. The 2D DFT vector is associated with a beam defined as a preferred angular direction of transmission in space of a radio signal where the preferred angular direction is a pair of azimuth and zenith (or equivalently elevation) angles. Each of the possible selected spatial basis vectors therefore corresponds to a direction in azimuth and zenith (or equivalently elevation) and a polarization. By restricting the set of linear combination coefficients which determine the power transmitted on each of the set of selected beams, the transmitted power in certain configured directions can be constrained to be less than some reference value. Typically, the constrained directions are generally in the direction of the horizon corresponding to a zenith angle of 90 degrees. For example, the constrained directions may be 90 degrees plus or minus 5 degrees. As a further example, the z-axis is perpendicular to a horizontal plane and the angle can be 90 degrees plus or minor 5 degrees, which results in an angle close to horizontal plus or minus 5 degrees.

CBSR in 3GPP NR is now described in more detail. A 2D antenna array is assumed with $N_1$ antenna elements in the vertical direction and $N_2$ number of antenna elements in the horizontal direction. Precoding matrices in the Rel.-15 Type II CSI codebook consist of a weighted combination of 2L selected spatial basis vector per layer. A spatial basis vector is defined as a length $2N_1N_2$ vector consisting of a length $N_1N_2$ 2D DFT vector occupying either the first or last $N_1N_2$ elements depending on the spatial basis vector's polarization with the remaining $N_1N_2$ elements being zero. Denoting the 2D DFT vector as $b_l \in \{0, 1, \ldots, 2L-1\}$, a spatial basis vector associated with a first polarization is therefore of the form $$\begin{bmatrix} b_l \\ 0 \end{bmatrix}$$

or of the form $$\begin{bmatrix} 0 \\ b_l \end{bmatrix}$$

when associated with a second polarization. Since as described above, each 2D DFT vector is associated with a beam, a spatial basis vector corresponds to a beam with its preferred angles of transmission along with a polarization. With L possible choices for the 2D DFT vector, each corresponding to a beam, and two possible polarizations, the number of spatial basis vectors is 2L. The precoding vector for each layer of a rank R transmission is the weighted sum of such spatial basis vectors where the weighting coefficients are complex-valued and frequency dependent, that is, they take on different values over the set of subcarriers in the transmission band. This set of subcarriers will be assumed to be divided into a set of $N_3$ Precoding Matrix Indicator (PMI) subbands, each containing some number of subcarriers. For example, each PMI subband may consist of 4*12 subcarriers corresponding to 4 physical resource blocks. The UE feeds back one precoding vector for each PMI subband. The precoding vector for PMI subband i is the weighted combination of the set of spatial basis vectors with the weighting coefficient for layer $\lambda$, beam l, index i, and polarization k, denoted $g_{prec}(\lambda, l, i, k)$. The precoding vector $p_\lambda(i)$ for layer $\lambda$ and PMI subband i, $0 \leq i < N_3$, is therefore $$p_\lambda(i) = \begin{bmatrix} p_{0,\lambda}(i) \\ p_{1,\lambda}(i) \end{bmatrix},$$

$$p_{k,\lambda}(i) = \sum_{l=0}^{l=L-1} g_{prec}(\lambda, l, i, k)b_l.$$

In 3GPP NR Rel.-15 Type II CBSR, the set of selected beams are restricted such that their azimuth and zenith angles, $\theta_l$ and $\phi_l$, are not within a set of restricted pairs. In addition, for each pair, a maximum amplitude for the weighting coefficients corresponding to the two spatial basis vectors associated with the restricted beam, $g_{prec}(\lambda, l, i, k)$, k=0, 1, is specified. The possible values for these maximum amplitudes are $$\left\{1, \frac{\sqrt{2}}{2}, \frac{1}{2}, 0\right\}$$

and are referenced to the maximum weighting coefficient magnitude over all spatial basis vectors and all frequencies. The restriction therefore limits the transmitted power in a PMI subband in the direction of a restricted beam. This restriction is natural since in Orthogonal Frequency Division Multiplexing (OFDM), subcarriers are modulated with information symbols and it is the interference appearing on those subcarriers that affect the rate of transmission supported on those subcarriers.

In 3GPP NR Release 16 Type II codebook, the precoder codebook still includes the same beam selection. However, indication of the coefficients $g_{prec}(\lambda, l, i, k)$ are not fed back. Instead, a DFT compressed codebook is used to compress the weighting coefficients where the compression occurs across frequency. This approach is based on the observation that the coefficients are highly correlated across frequency, that is across the i index. Instead of indicating the coefficients $g_{prec}(l, i, k, \lambda)$, a codebook is specified whose elements represent Fourier expansions of these coefficients across frequency.

$$g_{prec}(\lambda, l, i, k) = \sum_{m=0}^{M-1} c_{prec}(\lambda, l, n_{\lambda,m}, k)e^{j\frac{2\pi i n_{\lambda,m}}{N}}.$$

A compressed DFT codebook is a codebook where the precoding vectors across frequency are represented as a subset of the coefficients obtained by performing the DFT or inverse DFT of the precoding vectors' coefficients. The term compressed is used because for each beam, l, polarization, k, and layer $\lambda$, only M instead of $N_3$ $c_{prec}$ coefficients are fed back as part of CSI feedback. The set $n_{\lambda,m}$, m=0, 1, ..., M-1 for a given layer $\lambda$ are also fed back. This set is called set of Frequency Domain (FD) indices.

Due to the use of a DFT compressed codebook, it is not possible to limit the transmission power in a set of directions and a polarization within a PMI subband by restricting the amplitudes of its weighting coefficients $g_{prec}(l, i, k, \lambda)$ since the power in a PMI subband i on a specific DFT beam l, polarization k, and layer $\lambda$ is a function of all the coefficients $c_{prec}(\lambda, l, i, n_{\lambda,m})$ for $m_{\lambda,m}$ m=0, ..., M-1. Therefore, it can be appreciated that a need exists for codebook subset restriction for DFT compressed CSI codebooks.

Before describing particular embodiments, a brief overview of DFT-compressed CSI feedback as proposed for 3GPP Rel.-16 will be given to establish terms and mathematical notation useful in later descriptions of embodiments. The term "gNB" is used to describe a base station that is connected to a network. A gNB can be an unlicensed network base station, can be an access point, can be a base station controller, can be a network controller, can be a Transmission/Reception Point (TRP). Similarly, the term UE or UE device can be a wireless wide area network device, a user device, wireless terminal, a portable wireless communication device, a smartphone, a cellular telephone, a flip phone, a personal digital assistant, a personal computer, a selective call receiver, an Internet of Things (IoT) device, a tablet computer, a laptop computer, or any other device that is capable of sending and receiving communication signals on a wireless network.

For 3GPP Rel. 16 Type-II precoder, in addition to the legacy spatial domain DFT-based CSI compression in Rel. 15, additional compression in the frequency domain is imposed. More specifically, the frequency-domain precoding vectors are transformed using an inverse DFT to the time domain, and the magnitude and phase values of a subset of the time-domain coefficients are selected and fed back to the gNB as part of the CSI report. Assume the gNB is equipped with a two-dimensional antenna array with antenna ports per polarization placed horizontally and vertically and communication occurs over $N_3$ PMI subbands. A PMI subband consists of a set of resource blocks, each resource block consisting of a set of subcarriers. The $2N_1N_2 \times N_3$ precoding matrix for layer A takes the form $$W^{(\lambda)} = W_1 \tilde{W}_2^{(\lambda)} W_f^{(\lambda)H},$$

where $W_1$ is a $2N_1N_2 \times 2L$ block-diagonal matrix ($L < N_1N_2$) with two identical diagonal blocks, i.e., $$W_1 = \begin{bmatrix} B & 0 \\ 0 & B \end{bmatrix},$$

and B is an $N_1N_2 \times L$ matrix with columns drawn from a two-dimensional (2D) oversampled DFT matrix, as follows:

$$u_{m'} = \begin{bmatrix} 1 & e^{j\frac{2\pi m'}{O_2 N_2}} & \cdots & e^{j\frac{2\pi(N_2-1)}{O_2 N_2}} \end{bmatrix},$$

$$v_{l',m'} = \begin{bmatrix} u_{m'} & e^{j\frac{2\pi l'}{O_1 N_1}} u_{m'} & \cdots & e^{j\frac{2\pi(N_1-1)}{O_1 N_1}} u_{m'} \end{bmatrix}^T$$

$$B = \begin{bmatrix} v_{l'_0,m'_0} & v_{l'_1,m'_1} & \cdots & v_{l'_{L-1},m'_{L-1}} \end{bmatrix},$$

$$l'_i = O_1 n_1^{(i)} + q_1, \; 0 \le n_1^{(i)} < N_1, \; 0 \le q_1 < O_1,$$

$$m'_i = O_2 n_2^{(i)} + q_2, \; 0 \le n_2^{(i)} < N_2, \; 0 \le q_2 < O_2,$$

where the superscript T denotes a matrix transposition operation. Note that $O_1$, $O_2$ oversampling factors are assumed for the 2D DFT matrix from which matrix B is drawn. The matrix $W_f$ is an $N_3 \times M$ matrix ($M < N_3$) with columns selected from a critically sampled size-$N_3$ DFT matrix, as follows:

$$W_f^\lambda = \begin{bmatrix} f_{k_{\lambda,0}} & f_{k_{\lambda,1}} & \cdots & f_{k_{\lambda,M-1}} \end{bmatrix}, 0 \le k_{\lambda,i} < N_3,$$

$$f_k = \begin{bmatrix} 1 & e^{-j\frac{2\pi k}{N_3}} & \cdots & e^{-j\frac{2\pi k(N_3-1)}{N_3}} \end{bmatrix}^T.$$

A DFT-compression codebook is a set of combinations of parameters that describe precoding matrices of the form $W^{(\lambda)} = W_1 \tilde{W}_2^{(\lambda)} W_f^{(\lambda)H}$. Only the index pairs $(l'_i, m'_i)$ for $i=0, 1, \ldots, L-1$ of the L selected columns of B are indicated to the gNB, along with the oversampling indices $q_1$ and $q_2$. Similarly, for $W_f^\lambda$, only the indices of the M selected columns out of the predefined size-N3 DFT matrix are indicated to the gNB. Hence, L, M represent the equivalent spatial and frequency dimensions after compression, respectively. Finally, the $2L \times M$ matrix $\tilde{W}_2^{(\lambda)}$ elements contain Frequency Domain (FD) coefficients that are the coefficients of an expansion of the precoder in terms of spatial and frequency DFT-basis vectors. Each FD coefficient corresponds to a spatial basis index, or Spatial Domain (SD) basis index given by its row index in $\tilde{W}_2^{(\lambda)}$ and a frequency domain index, given by its column index in $\tilde{W}_2^{(\lambda)}$. The two diagonal blocks in $W_1$ can represent transmission on pairs of beams, each with the same column of B but with different polarizations. Non-zero magnitude and phase values of an approximately $\beta$ fraction of the 2LM available coefficients are indicated to the gNB ($\beta < 1$) as part of the CSI report. The coefficients with non-zero magnitude are indicated via a per-layer bitmap, $\beta_{n,m}^{(\lambda)}$, with $\lambda$ being the layer index, n being the SD basis index, and m being the FD basis index. The bitmap can be of size of 2LM bits, each bit corresponding to one of the 2LM available coefficients. Bits corresponding to coefficients with non-zero magnitude can be indicated with a '1' while coefficients with zero magnitude can be indicated with a '0'.

$$\beta_{n,m}^{(\lambda)} = \begin{cases} 1; & |\tilde{W}_2^{(\lambda)}(n,m)| > 0 \\ 0; & \text{otherwise} \end{cases}$$

Neither the magnitude nor the phase of the coefficient with the largest magnitude is indicated in the CSI report. Instead, an index corresponding to this coefficient, the Strongest Coefficient Indicator (SCI), is indicated to the gNB. The coefficient with largest magnitude will be referred to as the strongest coefficient below. For a single-layer transmission, magnitude and phase values of a maximum of $\lceil 2\beta LM \rceil - 1$ coefficients (along with the indices of selected L spatial DFT vectors, M Frequency Domain (FD) indices, and the SCI) are reported per layer. The FD coefficients that comprise $\tilde{W}_2^\lambda$ can be expressed as the product of a magnitude and a phase. For convenience, the spatial basis vectors are divided into two groups, spatial basis vectors with indices n belonging to $\{0, 1, \ldots, L-1\}$ correspond to a first polarization while those with indices n belonging to $\{L, L+1, \ldots, 2L-1\}$ correspond to a second polarization. Note that this terminology is only for the sake of convenience and referencing the subsets to a polarization does not imply that the DFT compression scheme described requires transmission on two different polarizations. The FD coefficient $\tilde{W}_2^{(\lambda)}(n, m)$ for layer $\lambda$, SD index n, and FD index m, can therefore be expressed $$\tilde{W}_2^{(\lambda)}(n, m) = p_{nmodL}\left(\lambda, m, \left[\frac{n}{L}\right]\right)\exp\left[j\Psi_{nmodL}\left(\lambda, m, \left[\frac{n}{L}\right]\right)\right]$$

where $p_l(\lambda, m, k)$ and $\Psi_l(\lambda, m, k)$ are the magnitude and phase respectively of the coefficient corresponding to layer $\lambda$, FD index m, polarization k+1, and SD index n. The quantity l=n mod L refers to the beam since it references the DFT column index.

The 2LM FD coefficients of layer $\lambda$ that make up the elements of $\tilde{W}_2^{(\lambda)}$ for that layer can be quantized separately for magnitude and phase and different references levels and quantization schemes can be used for quantization of FD coefficients with corresponding spatial basis vectors of different polarizations. The reference level and quantization scheme used to quantize an FD coefficient can depend on the polarization corresponding to that FD coefficient's spatial basis vector. For example, if the spatial basis vector corresponding to the strongest coefficient corresponds to the first polarization, then the reference level for quantization of FD coefficients whose corresponding spatial basis vector are likewise of the first polarization is a reference level $p_{ref,0}$. The other FD coefficients whose corresponding spatial basis vectors are of the second polarization can have a reference level $p_{ref,1}$. The other FD coefficients whose corresponding spatial basis vectors are of the second polarization can have a reference level that is not fixed but instead is indicated to the gNB as a quantized value.

In either case an FD coefficient can be represented as the product of a reference level times a differential value, the differential value belonging to a table of quantization levels. The magnitude of the FD coefficient for layer $\lambda$ which comprise $\tilde{W}_2^{(\lambda)}(n,m)$ will be denoted $p_l(\lambda, m, k)$ where l is the beam index and k is the polarization index. Note that n can be expressed in terms of l and k as n=kL+l. The coefficient magnitude can therefore be expressed $$p_l(\lambda,m,k)=\beta_{l,km}^{(\lambda)} p_{ref,k} p_{diff,l}(\lambda,m,k)$$

Using normalization, max{$p_{ref,0}$, $p_{ref,1}$} is set to 1 so only min{$p_{ref,0}$, $p_{ref,1}$} reported along with the index of the stronger polarization need be reported. The reference value for the phase of the FD coefficients of each layer is defined to be the phase of the strongest FD coefficient for that layer.

Embodiments can provide a method and apparatus for codebook subset restriction DFT-compressed channel state information feedback.

Figure 2:
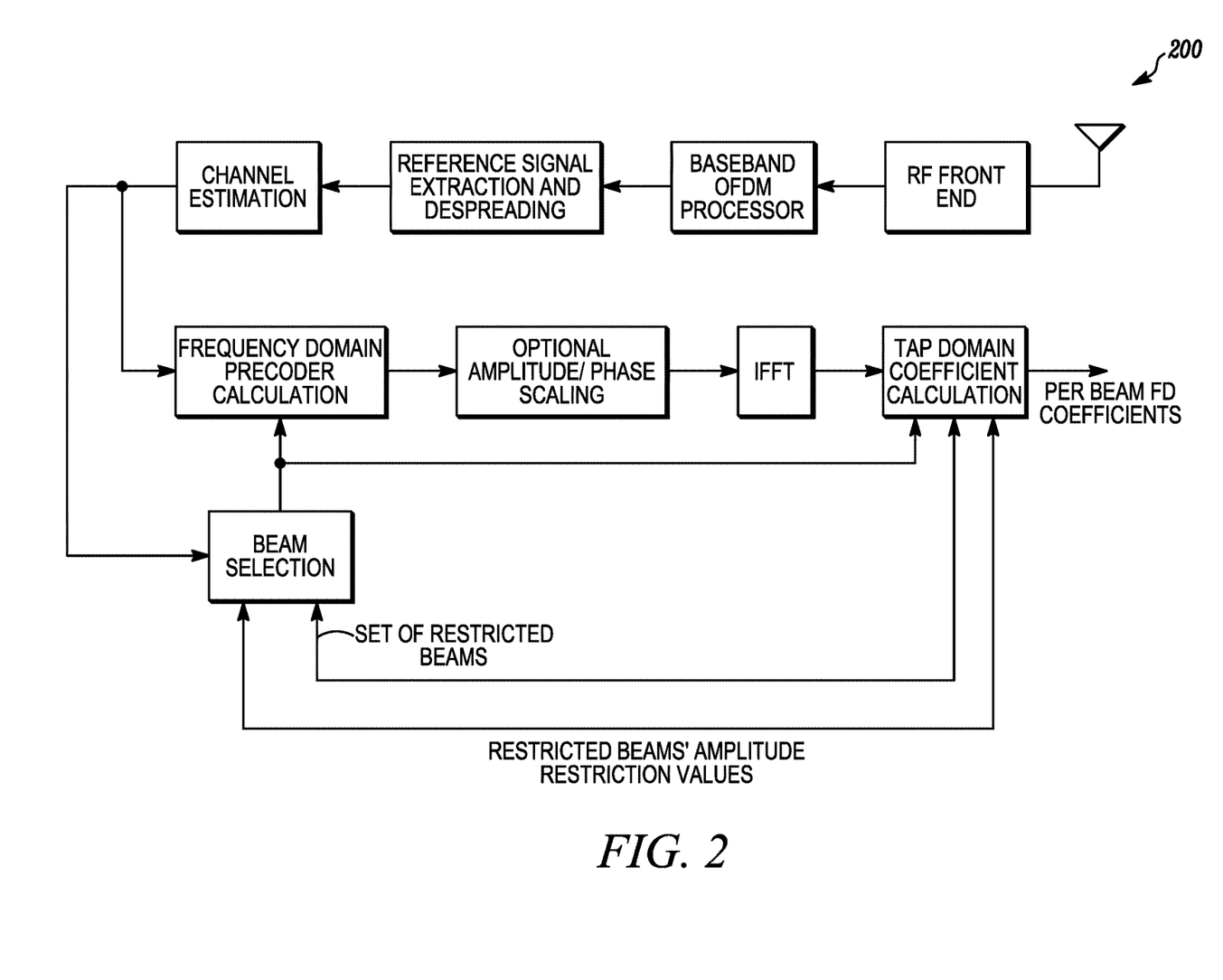
FIG. 2 is an example illustration of the functions of a UE device related to CSI feedback according to a possible embodiment.

FIG. 2 is an example illustration 200 of the functions of a UE device related to CSI feedback according to a possible embodiment. The signal received by the antenna is fed to the Radio Frequency (RF) front end, which translates the received signal to baseband where it is processed by the baseband OFDM processor. The baseband OFDM processor performs the usual OFDM receiver functions of time and frequency synchronization, cyclic prefix extraction, Fast Fourier Transform (FFT), and other functions needed to detect symbols modulated on OFDM subcarriers by the gNB transmitter. The detected set of subcarrier data is passed to the reference signal extraction and despreading block where received reference signals are extracted at the subcarriers and symbols corresponding to transmitted reference symbols. Reference signals are signals known by both the gNB and the UE and are used by the UE to perform such functions as channel estimation, timing, frequency acquisition. Despreading and descrambling of reference signals which have been multiplexed by Code Division Multiplexing (CDM) are also performed in this block. The extracted received reference symbols are fed to the channel estimation block, which forms channel estimates at a set of subcarriers and OFDM symbols and to the beam selection block. The beam selection block uses the generated channel estimates to determine a set of selected beams. The selection can for example be based on calculating the energy received on each the L beams summed over one or more polarizations.

The selection of beams is done considering a set of restricted beams denoted $\mathcal{R}_{res}$, drawn from the set of all $N_1N_2O_1O_2$ beams ($N_1N_2$ beams, each with $O_1O_2$ different oversampling indices). A restricted beam is a beam in which at least one of its corresponding beams (one for each polarization) is restricted. This set is indicated by the gNB to the UE. In one embodiment, the restricted set of beams is a subset of the union of $O_1O_2$ non-overlapping vector groups. Each vector group consists of $N_1N_2$ beams of the form $$G(r_1,r_2)=\{v_{N_1r_1+x_1,N_2r_2+x_2}: x_1=0,1,\ldots,N_1-1; x_2=0,1,\ldots,N_2-1\}$$

for $$r_1\in\{0,1,\ldots,O_1-1\}$$

$$r_2\in\{0,1,\ldots,O_2-1\}.$$

Each vector group therefore corresponds to a pair $(r_1, r_2)$ and a beam within a vector group corresponds to a pair $(x_1, x_2)$ with $$x_1\in\{0,1,\ldots,N_1-1\}$$

$$x_2\in\{0,1,\ldots,N_2-1\}.$$

The set of restricted beams is composed of a $N_{grps}$ number of vector groups, each vector group containing $N_1N_2$ beams. The gNB can indicate the set of restricted beams to the UE device by sending an indication of $(r_1^{(k)}, r_2^{(k)})$ for k= 0, 1, ..., $N_{grps}-1$. The quantity $N_{grps}$ can be equal to 4.

The gNB also indicates an amplitude restriction value indicated by part of the configuration for each beam in the set of restricted beams. The amplitude restriction value for beam index l, $\gamma_l$, specifies an upper limit on some metric of the fed back precoding matrix and the beam with index l. The amplitude restriction value can take one of a set of values, for example $$\sqrt{\gamma_l}\in\left\{1,\left(\frac{1}{2}\right)^{\frac{1}{2}},\left(\frac{1}{4}\right)^{\frac{1}{2}},0\right\}$$

Returning to FIG. 2, the beam selection block also has as inputs the sets of restricted beams R_res and the set of amplitude restriction values, $\gamma\_1$, l=0, 1, ..., N_grps N_1 N_2. When selecting a set of beams, the beam selection block can, for example, eliminate from consideration any beams that are members of R_res and which correspond to $\gamma\_1$=0. In an alternative embodiment, non-zero values of $\gamma\_1$ can also influence the selection of beams by the beam selection block.

The frequency domain precoder calculation is performed based on the channel estimates at a set of subcarriers and the set of selected beams. The frequency domain precoder for the first layer is a complex-valued weight vector, one for each set of subcarriers. Denoting the $N_f\times 2N_1N_2$ channel matrix at a subcarrier f as H(f) and $W_1$ defined as above with the columns of the B matrix corresponding to the selected beams, one embodiment of the frequency domain precoder for the first layer, $w_2^{(1)}(f)$, is the eigenvector which corresponds to the largest value of the matrix $$\sum_{f'=0}^{N_{PMI}^{sc}-1} W_1^H H^H(iN_{PMI}^{sc}+f')H(iN_{PMI}^{sc}+f')W_1$$

where the superscript H denote conjugate Hermitian transpose, $N_{PMI}^{sc}$ is the number of subcarriers per PMI subband. Here $N_r$ denotes the number of receive antennas at the UE. Once the frequency domain precoder for the first layer is determined, the second layer's frequency domain precoder, $w_2^{(2)}(f)$, can be determined by first modifying the matrix $H(f)W_1$ to include right multiplication by an orthogonal projection matrix $P_\perp$ that projects into the space orthogonal to that spanned by $w_2^{(1)}(f)$ and then finding the eigenvector corresponding to largest eigenvalue of $$\sum_{f'=0}^{N_{PMI}^{sc}-1} P_\perp^H W_1^H H^H(iN_{PMI}^{sc}+f')H(iN_{PMI}^{sc}+f')W_1 P_\perp.$$

A similar procedure can be used to obtain the frequency domain precoding vectors for layers greater than 2.

Once the frequency domain precoders have been calculated, they may optionally be scaled by the amplitude/phase scaling block. Here, the elements of a layer's precoding vector can be scaled by the inverse of the magnitude, the phase, or both, of the first element of the vector. For example, after scaling by both amplitude and phase, the first element of $w_2^{(\lambda)}(f)$ will be 1 for amplitude and phase scaling. Similarly, the elements of the precoding vectors can be permuted such that sum over frequency of the magnitude square of the elements of the permuted precoding vectors is maximum for the first element of the precoding vector.

After optional amplitude and phase scaling, the sequence of vectors $w_2^{(\lambda)}(f)$, $f=0, 1, \ldots, N_3-1$, can be transformed row by row with the Inverse FFT (IFFT) algorithm to obtain $N_3$ FD coefficient vectors, each of size $2L \times 1$, and each corresponding to one FD basis for a given layer. Here $N_3$ is the number of subcarrier sets in the band.

The FD coefficient vectors are then processed by the tap domain coefficient calculation block along with the selected beams, the set of restricted beams, and the set of amplitude restriction values.

Figure 3:
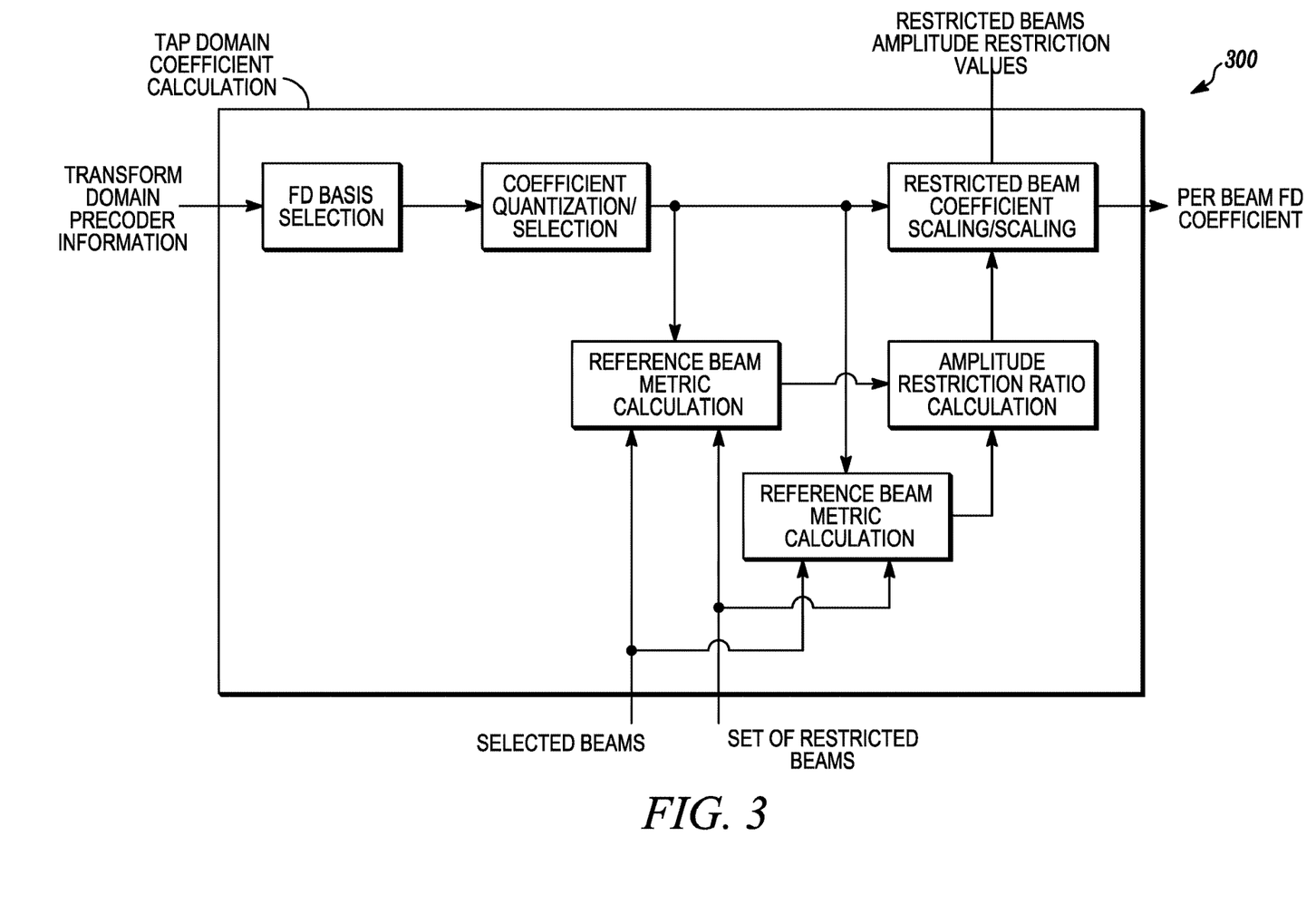
FIG. 3 is an example block diagram of a tap domain coefficient calculation block according to a possible embodiment.

FIG. 3 is an example block diagram 300 of the tap domain coefficient calculation block according to a possible embodiment. The FD basis selection block can select the FD bases of layer $\lambda$, $k_{\lambda,i}=0, 1, \ldots, M-1$, $0 \le k_{\lambda,i} < N_3$. The number of FD indices to be selected, M, can be indicated to the UE device by the gNB. The selected FD bases can be the set of FD bases whose corresponding FD coefficients' magnitude square and summed over beams is maximum over all FD bases of size M. Alternatively, a window that encompasses the FD indices can be selected with the position of the window optimized such that the sum of the magnitude square of the corresponding FD coefficients is maximized. The output of the FD basis selection block are the M FD coefficient vectors corresponding to the selected FD bases.

The output of the FD basis selection block is fed to the coefficient quantization/selection block. This block quantizes elements of the FD coefficient vectors according to some quantization scheme, for example as described above. In addition, coefficients can be set to zero. This can be done if they are small in magnitude since this can reduce the payload of the uplink control channel but have minimal impact on the accuracy of the fed back precoder. The output of the coefficient quantization/selection block are the FD coefficients corresponding to selected beams and selected FD bases, $\tilde{W}_2^{(\lambda)}(n,m)$.

For restricted beam calculation, the FD coefficients are fed to two blocks, the reference metric calculation block and the restricted beam metric calculation block. The restricted beam metric calculation block calculates a restricted beam metric for a given layer) $\lambda$, polarization k, and beam index $l_0$ based on the FD coefficients corresponding to a spatial beam and is denoted $\Gamma_{res,l_0}(\lambda,k)$. The restricted beam metric is a measure of the power or more generally the interference that will be caused in the direction of a spatial beam $l_0$ when the gNB precodes data with the fed back precoder coefficients $\tilde{W}_2^{(\lambda)}(n,m)$, $n=0, 1, \ldots, 2L-1$, $m=0, 1, \ldots, M-1$. There are multiple ways this can be measured. Several embodiments are given below. Note that one spatial beam corresponds to a spatial beam/polarization pair. In one embodiment one restricted beam metric is calculated for each restricted spatial beam/polarization index pair. In one embodiment the restricted metric is equal to the square root of the sum power of coefficients corresponding to the restricted DFT spatial beam. In the equations below the inclusion of the bitmap $\beta^{(\lambda)}(n,m) \in \{0,1\}$ multiplies the square of the FD coefficient magnitudes to make the equation well defined in the case where one or more coefficient magnitudes in the summation are not included in the CSI report (as described earlier) and therefore either aren't assigned a value in the UE or are assigned some arbitrary value in a quantization table that does not include the value of '0'.

$$\Gamma_{res,l_0}(\lambda, k) = \sum_{m=0}^{M-1} \beta^{(\lambda)}(kL+l, m) p_{l_0}^2(\lambda, m, k).$$

As described above $p_{l_0}(\lambda, m, k)$ is the magnitude of the FD coefficient corresponding to spatial beam $n_0 = kL + l_0$. Another embodiment of the restricted beam metric is the square root of the sum of coefficient powers squared.

$$\Gamma_{res,l_0}(\lambda, k) = \sqrt{\sum_{m=0}^{M-1} \beta^{(\lambda)}(kL+l, m) p_{l_0}^2(\lambda, m, k)}.$$

Note that it is also possible to define a restricted beam metric in terms of only a layer and beam $l_0$. This may be done by summing or averaging the power of FD coefficients corresponding to the same beam over polarizations. One such embodiment is a reference beam defined as $$\Gamma_{res,l_0}(\lambda) = \sum_{k=0}^{1} \sum_{m=0}^{M-1} \beta^{(\lambda)}(kL+l, m) p_{l_0}^2(\lambda, m, k).$$

Yet another embodiment of the restricted beam metric calculation block generates a metric which is layer-common, i.e., independent of the layer by either averaging or summing over the layers $$\Gamma_{res,l_0} = \sum_{\lambda=0}^{RI-1}\sum_{k=0}^{1}\sum_{m=0}^{M-1}\beta^{(\lambda)}(kL+l,m)p_{l_0}^2(\lambda,m,k)$$

The reference metric calculation block calculates a reference metric based on the FD coefficients of a subset of the selected beams and the set restricted beams. The reference metric is a baseline of an interference level generated by a fed back precoder. In one embodiment the reference metric is equal to the square root of the maximum of the set of sum of the squared magnitude coefficients of beams that are not members of the restricted set of beams.

$$\Gamma_{ref}(\lambda,k) = \max_{l\notin\mathcal{L}_{res}}\sum_{m=0}^{M-1}\beta^{(\lambda)}(kL+l,m)p_l^2(\lambda,m,k).$$

The presence of the bit map $\beta^{(\lambda)}(kL+l, m)$ is explained in the above section. The square root and maximum operations can be interchanged without affecting the value $\Gamma_{ref}$ at least to within finite precision effects. In this embodiment there is a reference metric for each layer/polarization index pair. This embodiment has the advantage that it is independent of the FD coefficients of beams corresponding to the restricted set of beams and therefore will not change if FD coefficient magnitudes are reduced to satisfy a constraint on the restricted beam amplitude values as will be discussed below. It also has the advantage that it is analogous to the reference metric that is used in 3GPP NR Rel.-15 where instead of beam powers being restricted, the maximum magnitude of the power of precoder domain coefficients over frequency are restricted. The reference metric in 3GPP NR Rel.-15 is the maximum precoding domain coefficient magnitude over all beams and all PMI subbands. Therefore, in both Rel.-15 and with the embodiment above the reference metric was independent of restricted beams' precoding coefficients since a maximum beam cannot be a restricted beam in either Rel.-15 or the above embodiment.

In a second embodiment of the reference metric block, a maximization is also performed over polarization which makes the reference metric a function of only the layer index $$\Gamma_{ref}(\lambda) = \max_{k\in\{0,1\},l\notin\mathcal{L}_{res}}\sum_{m=0}^{M-1}\beta^{(\lambda)}(kL+l,m)p_l^2(\lambda,m,k).$$

This embodiment shares the same desirable properties of previous embodiment. In another embodiment the reference metric is summed over the FD coefficients corresponding to a single DFT beam and therefore over polarizations again with the reference metric being independent of FD coefficients of any restricted beam:

$$\Gamma_{ref}(\lambda) = \max_{l\notin\mathcal{L}_{res}}\sum_{k=0}^{1}\sum_{m=0}^{M-1}\beta^{(\lambda)}(kL+l,m)p_l^2(\lambda,m,k).$$

In another embodiment the reference metric is the maximum over all restricted beams not including the beam $l_0$ and therefore the reference metric is a function of not only the polarization index and the layer but also the restricted beam $$\Gamma_{ref,l_0}(\lambda,k) = \max_{l\neq l_0}\sum_{m=0}^{M-1}\beta^{(\lambda)}(kL+l,m)p_l^2(\lambda,m,k).$$

In another embodiment the reference metric is similar to the previous embodiment but the maximization is over all polarizations:

$$\Gamma_{ref,l_0}(\lambda) = \max_{k\in\{0,1\}}\max_{l\neq l_0}\sum_{m=0}^{M-1}\beta^{(\lambda)}(kL+l,m)p_l^2(\lambda,m,k).$$

In this case the reference metric is polarization-common and a function of the layer index and the beam index. Yet another embodiment for the reference metric sums over the layers to obtain a layer-common reference metric.

$$\Gamma_{ref} = \max_{l\notin\mathcal{L}_{res}}\sum_{\lambda=0}^{RI-1}\sum_{k=0}^{1}\sum_{m=0}^{M-1}\beta^{(\lambda)}(kL+l,m)p_l^2(\lambda,m,k).$$

Another embodiment of a layer-common reference metric uses the maximum over layers of the sum squared of magnitudes.

$$\Gamma_{ref} = \max_{l\notin\mathcal{L}_{res}}\max_{0\leq\lambda<RI}\sum_{k=0}^{1}\sum_{m=0}^{M-1}\beta^{(\lambda)}(kL+l,m)p_l^2(\lambda,m,k).$$

Similar to what is described above for restricted beam metrics, other embodiments of the reference metric can be expressed in the amplitude domain instead of the power domain with the inclusion of a square root of the reference beam metrics embodiments described above.

The amplitude restriction ratio calculation block generates the amplitude restriction ratio of a beam or beam/polarization index pair. The amplitude restriction ratio is the ratio of a restricted beam metric and a reference metric. Corresponding to embodiments described above for the restricted beam metric and the reference metric, an embodiment of the amplitude restriction ratio is $$\frac{\sum_{m=0}^{M-1}p_{l_0}^2(\lambda,m,k)}{\max_{l\notin\mathcal{L}_{res}}\sum_{m=0}^{M-1}p_l^2(\lambda,m,k)}.$$

The amplitude ratio may also be expressed as the square root of the ratios of the squares of the restricted beam metric and reference beam metric:

$$\sqrt{\frac{\sum_{m=0}^{M-1}p_{l_0}^2(\lambda,m,k)}{\max_{l\notin\mathcal{L}_{res}}\sum_{m=0}^{M-1}p_l^2(\lambda,m,k)}}$$

Using another of the above embodiments gives an amplitude restriction ratios of $$\frac{\sum_{m=0}^{M-1} p_{l_0}^2(\lambda, m, k)}{\max_{l \notin \mathcal{L}_{res}} \max_{k \in \{0,1\}} \sum_{m=0}^{M-1} p_l^2(\lambda, m, k)}.$$

Any of the combinations of the above embodiments of restricted beam metric and reference metrics can be combined as a ratio to obtain an amplitude restriction of a beam or beam.

The output of the amplitude restriction ratio calculation block is fed to the restricted beam coefficient/selection block along with the quantized FD coefficients. In one embodiment the restricted beam coefficient scaling block scales FD coefficients in the restricted beams whose corresponding amplitude restriction ratio exceed the signaled restricted beam amplitude restriction values $\gamma_{l_0}$, $l_0 \in \mathcal{R}_{res}$. This block first identifies a beam with index $l_0$, layer $\lambda$, and polarization k such that the amplitude ratio is greater than the signaled amplitude signaled restriction value for the corresponding beam $l_0$.

$$\frac{\Gamma_{res,l_0}(\lambda, k)}{\Gamma_{ref}(\lambda, k)} > \gamma_{l_0}.$$

Next it generates the modified set of FD coefficients by scaling down their magnitudes $p_{l_0}(\lambda,m,k)$, $m=0, 1, \ldots, M-1$ by the factor $\alpha_m$, $\alpha_m \geq 1$ to form the new magnitude coefficients $$\hat{p}_{l_0}(\lambda, m, k) = \frac{1}{\alpha_m} p_{l_0}(\lambda, m, k),$$

$m=0, 1, \ldots, M-1$. One choice of the $\alpha_m$ is $\alpha_m = \alpha$ where $\alpha$ is the smallest number greater than or equal to 1 such that $$\frac{\hat{\Gamma}_{res}(\lambda, k)}{\hat{\Gamma}_{ref}(\lambda, k)} \leq \gamma_{l_0}$$

where $\hat{\Gamma}_{res}(\lambda, k)$ and $\hat{\Gamma}_{ref}(\lambda, k)$ denote the restricted beam metrics and the reference metrics as function of $\hat{p}_{l_0}(\lambda, m, k)$, $m=0, 1, \ldots, M-1$. The choice of a may be constrained by the quantization levels used available to represent $\hat{p}_{l_0}(\lambda, m, k)$. For example, a may need to be a power of $\sqrt{2}/2$. This embodiment can be applied to any embodiments of the amplitude restriction ratio and corresponding embodiments of the reference metric and restricted beam metric.

A second embodiment of the restricted coefficient/selection block sets to zero some number of FD coefficients corresponding to a beam index $l_0$, layer $\lambda$, and polarization k whose amplitude ratio is less than the signaled amplitude restriction value for the corresponding beam.

$$\frac{\Gamma_{res,l_0}(\lambda, k)}{\Gamma_{ref}(\lambda, k)} > \gamma_{l_0}.$$

In this embodiment, the FD coefficients of a violating beam can first be sorted in ascending order of their magnitudes. The first FD coefficient is set to zero, the above inequality is checked and if it is still not satisfied the next largest FD coefficient is set to zero, the inequality is checked, and so on.

A third embodiment combines the first two by allowing the possibility to scale a coefficient down instead of setting it to zero if a scaling factor can be found that will cause the above inequality to be satisfied. Beginning with the coefficient of smallest magnitude, the inequality above is evaluated and if it is not satisfied, it is determined whether a scaling of the coefficient by a factor $\alpha_1 > 1$ will allow the inequality to be satisfied given any constraints imposed on $\alpha_1$ by the necessity that the scaled coefficients magnitude must be representable by a quantization level. If such an $\alpha_1$ does exist then that coefficient is scaled down by the factor $\alpha_1$ and the FD coefficients are sent to the gNB as part of the CSI report. If the inequality is not satisfied, it is determined if a scaling factor $\alpha_2 > 1$ applied to the coefficient with the next largest magnitude subject to the constraint on its magnitude being a quantization level is satisfied.

If such a factor $\alpha_2$ exists, then the coefficient is scaled with this coefficient and the FD coefficients ae sent to the gNB as part of the CSI report. If not, the coefficient is set to zero and the process continues. If the process continues until the strongest coefficient is left, a scaling factor will exist that will cause the above inequality to be satisfied. This scale factor will be equal to one over the largest quantization level which is below the amplitude restriction value for the violating beam.

The calculation of the amplitude restriction ratio does not necessarily require that the reference beam metric and restricted beam metric be calculated separately or in any order. It is only important that a value of the amplitude restriction ratio be calculated that equals that calculated by the ratio of reference beam and restricted metrics.

It should be noted that if the amplitude restriction ratio is expressed as the square root of the sum of coefficient magnitude powers, then in the above step the amplitude restriction ratio should be compared with the square root of the signaled restricted beam value, $\sqrt{\gamma_{l_0}}$ instead of the signaled restricted beam value itself $\gamma_{l_0}$.

Figure 4:
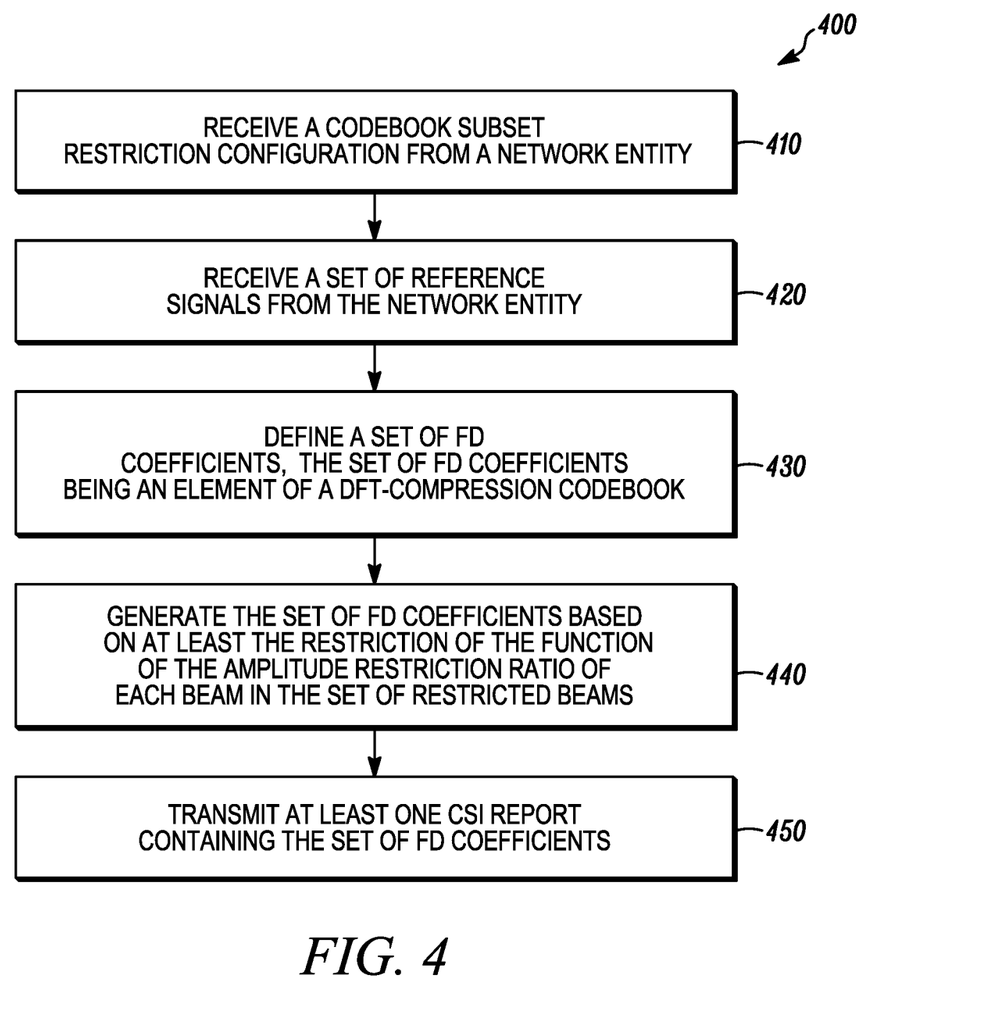
FIG. 4 is an example flowchart illustrating the operation of a wireless communication device according to a possible embodiment.

FIG. 4 is an example flowchart 400 illustrating the operation of a wireless communication device, such as the UE 110, according to a possible embodiment. At 410, a codebook subset restriction configuration can be received from a network entity. For example, the codebook subset restriction can be received from a base station, a TRP, an access point, or other network entity. The codebook subset restriction configuration can indicate a set of restricted beams. The codebook subset restriction configuration can also indicate amplitude restriction values for each restricted beam in the set of restricted beams. The codebook subset restriction configuration can also indicate a set restricted vector groups. Each restricted vector group can correspond to a set of restricted beams.

At 420, a set of reference signals can be received from the network entity.

At 430, a set of FD coefficients can be defined. The set of FD coefficients can be an element of a DFT-compression codebook. Each FD coefficient of the set of FD coefficients can correspond to a beam. For example, each coefficient can have a set of indices including spatial basis/beam indices, frequency basis indices, and layer indices.

Each FD coefficient of the set of FD coefficients can correspond to a beam. A beam that has an FD coefficient can have at least one FD coefficient. Each beam of the set of restricted beams can correspond to a function of an amplitude restriction ratio. For example, an amplitude restriction ratio calculation block can generate the amplitude restriction ratio of a beam or beam/polarization index pair.

The function of the amplitude restriction ratio of each restricted beam can be restricted to be less than or equal to the amplitude restriction value corresponding to the corresponding the restricted beam. For example, the amplitude restriction value for beam index l, $\gamma_l$, can specify an upper limit on some metric of the fed back precoding matrix and the beam with index l.

The amplitude restriction ratio of each restricted beam can be a ratio of a restricted beam metric corresponding to each restricted beam and a reference metric corresponding to each restricted beam. The restricted beam metric can be a function of FD coefficients corresponding to only the corresponding restricted beam. For example, the restricted beam metric can be a measure of the power or, more generally, the interference that will be caused in the direction of a spatial beam $l_0$ when the gNB precodes data with the fed back precoder coefficients $\tilde{W}_2^{(\lambda)}(n, m)$, $n=0, 1, \ldots, 2L-1$, $m=0, 1, \ldots, M-1$. The reference metric corresponding to each restricted beam can be a function of at least a subset of FD coefficients corresponding to beams other than the restricted beam. For example, a reference metric calculation block can calculate a reference metric based on the FD coefficients of a subset of the selected beams and the set restricted beams.

At 440, the set of FD coefficients can be generated based on at least the restriction of the function of the amplitude restriction ratio of each beam in the set of restricted beams. For example, by restricting the set of linear combination coefficients which determine the power transmitted on each of the set of selected beams, the transmitted power in certain configured directions can be constrained to be less than some reference value. As another example, the output of an amplitude restriction ratio calculation block can be fed to a restricted beam coefficient/selection block along with the quantized FD coefficients. In one embodiment, a restricted beam coefficient scaling block can scale FD coefficients in the restricted beams whose corresponding amplitude restriction ratio exceed the signalled restricted beam amplitude restriction values.

At 450, at least one CSI report containing the set of FD coefficients can be transmitted. The at least one CSI report can be transmitted to the network entity.

According to a possible embodiment, the reference metric corresponding to each restricted beam can be a function of a subset of the FD coefficients corresponding to only beams other than the restricted beam. According to a possible embodiment, the function of the amplitude restriction ratio can be a square root of the amplitude restriction ratio. According to a possible embodiment, the function of the amplitude restriction ratio can be the amplitude restriction ratio itself.

According to a possible embodiment, the restricted beam metric corresponding to each restricted beam can be the sum of the magnitude square of the non-zero FD coefficients corresponding to the restricted beam in a given layer. For example, this embodiment can correspond to a case where summation is across per layer, and per polarization for each restricted beam.

According to a possible embodiment, the restricted beam metric corresponding to each restricted beam can be the sum of the magnitude square of the non-zero FD coefficients corresponding to a pair of restricted beams in a given layer. For example, this embodiment can correspond to a case where summation is per layer, but across both polarizations for each restricted beam.

According to a possible embodiment, the restricted beam metric corresponding to each restricted beam the sum of the magnitude square of the non-zero FD coefficients corresponding to the restricted beam summed across all layers. For example, this embodiment can correspond to a case where summation is across all layers, but per polarization for each restricted beam.

According to a possible embodiment, the restricted beam metric corresponding to each restricted beam can be the sum of the magnitude square of the non-zero FD coefficients corresponding to a pair of restricted beams summed across all layers. For example, this embodiment can correspond to a case where summation is across all layers and polarizations for each restricted beam.

According to a possible embodiment, the reference metric corresponding to each restricted beam can be a function of a set of beam powers of all beams other than the corresponding restricted beam. A beam power of a beam can be equal to the sum of a magnitude square of the non-zero FD coefficients of at least one beam. For example, the non-zero aspect of the FD coefficient can indicate the parameter $\beta$ in the reference metric equations. Otherwise the parameter $\beta$ can be 0 when FD coefficients are not selected. The beam power can be sum of a magnitude square of the non-zero FD coefficients of one beam or of a number, k, of beams, such as when the beam powers are summed across two polarizations of beams.

According to a possible implementation of the above embodiment, the function of the set of beam powers can be a maximum of the set of beam powers of beams other than the restricted beam in a given layer. For example, this implementation can correspond to a case where summation is within a layer of beams for the reference metric.

According to a possible implementation of the above embodiment, the function of the set of beam powers can be a maximum of the set of beam powers of beams other than the restricted beam summed over all layers. For example, this implementation can correspond to a case where summation is across layers of beams for the reference metric.

According to a possible implementation of the above embodiment, the function of the set of beam powers can be a maximum of the set of beam powers of beams other than the restricted beam across all layers. For example, this implementation can correspond to a case where summation is over the maximum layer of beams for the reference metric.

According to a possible implementation of the above embodiment, the beam power of a beam can be equal to the sum of a magnitude square of the non-zero FD coefficients of a pair of beams. For example, this implementation can correspond to a case where summation is across both polarizations of a pair beams for the reference metric.

It should be understood that, notwithstanding the particular steps as shown in the figures, a variety of additional or different steps can be performed depending upon the embodiment, and one or more of the particular steps can be rearranged, repeated or eliminated entirely depending upon the embodiment. Also, some of the steps performed can be repeated on an ongoing or continuous basis simultaneously while other steps are performed. Furthermore, different steps can be performed by different elements or in a single element of the disclosed embodiments. Additionally, a network entity, such as a base station, TRP, mobility management entity, or other network entity, can perform reciprocal operations of a UE. For example, the network entity can transmit signals received by the UE and can receive signals transmitted by the UE. The network entity can also process and operate on sent and received signals.

Figure 5:
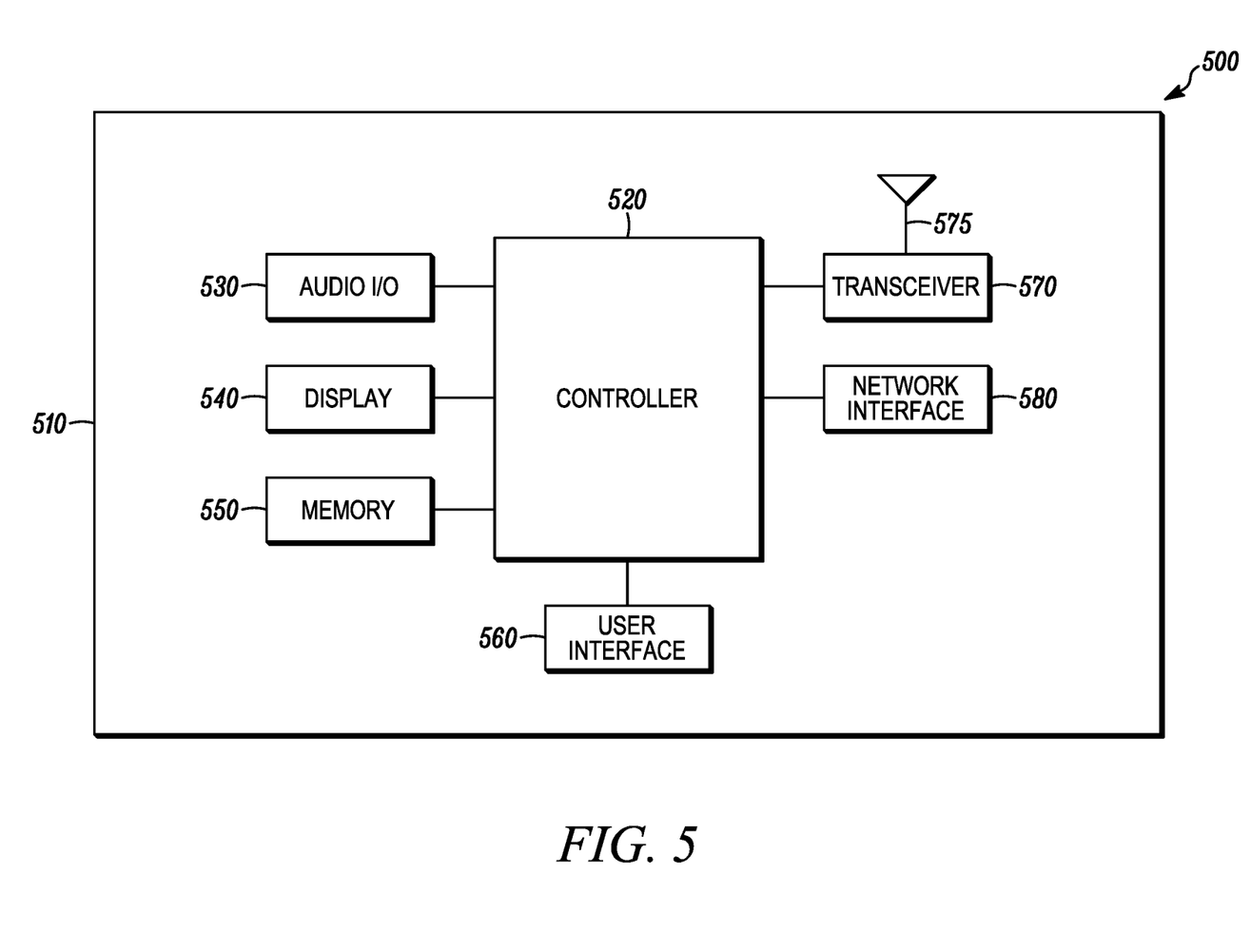
FIG. 5 is an example block diagram of an apparatus according to a possible embodiment.

FIG. 5 is an example block diagram of an apparatus 500, such as the UE 110, the network entity 120, or any other wireless communication device disclosed herein, according to a possible embodiment. The apparatus 500 can include a housing 510, a controller 520 coupled to the housing 510, audio input and output circuitry 530 coupled to the controller 520, a display 540 coupled to the controller 520, a memory 550 coupled to the controller 520, a user interface 560 coupled to the controller 520, a transceiver 570 coupled to the controller 520, at least one antenna 575 coupled to the transceiver 570, and a network interface 580 coupled to the controller 520. The apparatus 500 may not necessarily include all of the illustrated elements for different embodiments of the present disclosure. The apparatus 500 can perform the methods described in all the embodiments.

The display 540 can be a viewfinder, a Liquid Crystal Display (LCD), a Light Emitting Diode (LED) display, an Organic Light Emitting Diode (OLED) display, a plasma display, a projection display, a touch screen, or any other device that displays information. The transceiver 570 can be one or more transceivers that can include a transmitter and/or a receiver. The audio input and output circuitry 530 can include a microphone, a speaker, a transducer, or any other audio input and output circuitry. The user interface 560 can include a keypad, a keyboard, buttons, a touch pad, a joystick, a touch screen display, another additional display, or any other device useful for providing an interface between a user and an electronic device. The network interface 580 can be a Universal Serial Bus (USB) port, an Ethernet port, an infrared transmitter/receiver, an IEEE 1394 port, a wireless transceiver, a WLAN transceiver, or any other interface that can connect an apparatus to a network, device, and/or computer and that can transmit and receive data communication signals. The memory 550 can include a Random-Access Memory (RAM), a Read Only Memory (ROM), an optical memory, a solid-state memory, a flash memory, a removable memory, a hard drive, a cache, or any other memory that can be coupled to an apparatus.

The apparatus 500 or the controller 520 may implement any operating system, such as Microsoft Windows®, UNIX®, LINUX®, Android™, or any other operating system. Apparatus operation software may be written in any programming language, such as C, C++, Java, or Visual Basic, for example. Apparatus software may also run on an application framework, such as, for example, a Java® framework, a .NET® framework, or any other application framework. The software and/or the operating system may be stored in the memory 550, elsewhere on the apparatus 500, in cloud storage, and/or anywhere else that can store software and/or an operating system. The apparatus 500 or the controller 520 may also use hardware to implement disclosed operations. For example, the controller 520 may be any programmable processor. Furthermore, the controller 520 may perform some or all of the disclosed operations. For example, at least some operations can be performed using cloud computing and the controller 520 may perform other operations. At least some operations can also be performed computer executable instructions executed by at least one computer processor. Disclosed embodiments may also be implemented on a general-purpose or a special purpose computer, a programmed microprocessor or microprocessor, peripheral integrated circuit elements, an application-specific integrated circuit or other integrated circuits, hardware/ electronic logic circuits, such as a discrete element circuit, a programmable logic device, such as a programmable logic array, field programmable gate-array, or the like. In general, the controller 520 may be any controller or processor device or devices capable of operating an apparatus and implementing the disclosed embodiments. Some or all of the additional elements of the apparatus 500 can also perform some or all of the operations of the disclosed embodiments.

In operation, the apparatus 500 can perform the methods and operations of the disclosed embodiments. The transceiver 570 can transmit and receive signals, including data signals and control signals that can include respective data and control information. The controller 520 can generate and process the transmitted and received signals and information.

In operation according to a possible embodiment, the transceiver 570 can receive a codebook subset restriction configuration from a network entity. The codebook subset restriction configuration can indicate a set of restricted beams. The codebook subset restriction configuration can also indicate amplitude restriction values for each restricted beam in the set of restricted beams. The transceiver 570 can receive a set of reference signals from the network entity.

The controller 520 can define a set of FD coefficients. The set of FD coefficients can be an element of a DFT-compression codebook. Each FD coefficient of the set of FD coefficients can correspond to a beam. For example, each coefficient can have a set of indices including spatial basis/ beam indices, frequency basis indices, and layer indices. Each FD coefficient of the set of FD coefficients can correspond to a beam. A beam that has an FD coefficient can have at least one FD coefficient. Each beam of the set of restricted beams can correspond to a function of an amplitude restriction ratio. For example, an amplitude restriction ratio calculation block can generate the amplitude restriction ratio of a beam or beam/polarization index pair.

The function of the amplitude restriction ratio of each restricted beam can be restricted to be less than or equal to the amplitude restriction value corresponding to the corresponding the restricted beam. For example, the amplitude restriction value for beam index l, $\gamma_l$, can specify an upper limit on some metric of the fed back precoding matrix and the beam with index l.

The amplitude restriction ratio of each restricted beam can be a ratio of a restricted beam metric corresponding to each restricted beam and a reference metric corresponding to each restricted beam. The restricted beam metric can be a function of FD coefficients corresponding to only the corresponding restricted beam. For example, the restricted beam metric can be a measure of the power or, more generally, the interference that will be caused in the direction of a spatial beam $l_0$ when the gNB precodes data with the fed back precoder coefficients $\tilde{W}_2^{(\lambda)}(n, m)$, n=0, 1, ..., 2L−1, m=0, 1, ..., M−1. The reference metric corresponding to each restricted beam can be a function of at least a subset of FD coefficients corresponding to beams other than the restricted beam. For example, a reference metric calculation block can calculate a reference metric based on the FD coefficients of a subset of the selected beams and the set restricted beams.

The controller 520 can generate the set of FD coefficients based on at least the restriction of the function of the amplitude restriction ratio of each beam in the set of restricted beams. The transceiver 570 can transmit at least one CSI report containing the set of FD coefficients.

According to a possible embodiment, the reference metric corresponding to each restricted beam can be a function of a subset of the FD coefficients corresponding to only beams other than the restricted beam. According to a possible embodiment, the function of the amplitude restriction ratio can be a square root of the amplitude restriction ratio. According to a possible embodiment, the function of the amplitude restriction ratio can be the amplitude restriction ratio itself.

According to a possible embodiment, the restricted beam metric corresponding to each restricted beam can be the sum of the magnitude square of the non-zero FD coefficients corresponding to the restricted beam in a given layer. For example, this embodiment can correspond to a case where summation is across per layer, and per polarization for each restricted beam.

According to a possible embodiment, the restricted beam metric corresponding to each restricted beam can be the sum of the magnitude square of the non-zero FD coefficients corresponding to a pair of restricted beams in a given layer. For example, this embodiment can correspond to a case where summation is per layer, but across both polarizations for each restricted beam.

According to a possible embodiment, the restricted beam metric corresponding to each restricted beam the sum of the magnitude square of the non-zero FD coefficients corresponding to the restricted beam summed across all layers. For example, this embodiment can correspond to a case where summation is across all layers, but per polarization for each restricted beam.

According to a possible embodiment, the restricted beam metric corresponding to each restricted beam can be the sum of the magnitude square of the non-zero FD coefficients corresponding to a pair of restricted beams summed across all layers. For example, this embodiment can correspond to a case where summation is across all layers and polarizations for each restricted beam.

According to a possible embodiment, the reference metric corresponding to each restricted beam can be a function of a set of beam powers of all beams other than the corresponding restricted beam. A beam power of a beam can be equal to the sum of a magnitude square of the non-zero FD coefficients of at least one beam. For example, the non-zero aspect of the FD coefficient can indicate the parameter β in the reference metric equations. Otherwise the parameter β can be 0 when FD coefficients are not selected. The beam power can be sum of a magnitude square of the non-zero FD coefficients of one beam or of a number, k, of beams, such as when the beam powers are summed across two polarizations of beams.

According to a possible implementation of the above embodiment, the function of the set of beam powers can be a maximum of the set of beam powers of beams other than the restricted beam in a given layer. For example, this implementation can correspond to a case where summation is within a layer of beams for the reference metric.

According to a possible implementation of the above embodiment, the function of the set of beam powers can be a maximum of the set of beam powers of beams other than the restricted beam summed over all layers. For example, this implementation can correspond to a case where summation is across layers of beams for the reference metric.

According to a possible implementation of the above embodiment, the function of the set of beam powers can be a maximum of the set of beam powers of beams other than the restricted beam across all layers. For example, this implementation can correspond to a case where summation is over the maximum layer of beams for the reference metric.

According to a possible implementation of the above embodiment, the beam power of a beam can be equal to the sum of a magnitude square of the non-zero FD coefficients of a pair of beams. For example, this implementation can correspond to a case where summation is across both polarizations of a pair beams for the reference metric.

According to a possible embodiment, a method can include receiving a messaging providing a configuration parameter indicating a set vector groups from a gNB. Each vector group can correspond to a set of restricted beams. The method can include receiving a message from a gNB containing an indication of amplitude restriction values for each of the restricted beams in the sets of restricted beams. The method can include receiving a set of reference signals transmitted from a gNB. The method can include generating a set of frequency domain (FD) coefficients. The set of FD coefficients can be an element of a DFT-compression codebook. Each FD coefficient can correspond to a beam. Each FD coefficient that corresponds to a restricted beam can correspond to an amplitude restriction ratio. Each amplitude restriction ratio can correspond to the FD coefficient's restricted beam. The amplitude restriction ratio of each restricted beam can be less than or equal to the amplitude restriction value corresponding to the restricted beam. The amplitude restriction ratio of each restricted beam can be the ratio of a restricted beam metric corresponding to each restricted beam and a reference metric corresponding to each restricted beam. The restricted beam metric can be a function of only the coefficients corresponding to the restricted beam. The reference metric corresponding to each restricted beam can be a function of only the FD coefficients corresponding to beams other than the restricted beam. The method can include transmitting a message containing the set of FD coefficients to the gNB.

According to a possible embodiment, the restricted beam metric corresponding to each restricted beam can be the sum of the magnitude square of the FD coefficients corresponding to the restricted beam.

According to a possible embodiment, the reference metric corresponding to each restricted beam can be a function of the set of beam powers of all beams other than the restricted beam. The beam power of a beam can be equal to the sum of the magnitude square of the FD coefficients of a beam.

According to a possible embodiment, the function of the set of beams powers can be the maximum of the set of beam powers of beams other than the restricted beam.

According to a possible embodiment, the restricted beam metric corresponding to each restricted beam can be the sum of the magnitude square of the FD coefficients corresponding to the restricted beam. The reference metric corresponding to each restricted beam can be the maximum of the set of beam powers of all beams other than the restricted beam. The beam power of a beam can be equal to the sum of the magnitude square of the FD coefficients of the beam.

At least some methods of this disclosure can be implemented on a programmed processor. However, the controllers, flowcharts, and modules may also be implemented on a general purpose or special purpose computer, a programmed microprocessor or microcontroller and peripheral integrated circuit elements, an integrated circuit, a hardware electronic or logic circuit such as a discrete element circuit, a programmable logic device, or the like. In general, any device on which resides a finite state machine capable of implementing the flowcharts shown in the figures may be used to implement the processor functions of this disclosure.

At least some embodiments can improve operation of the disclosed devices. Also, while this disclosure has been described with specific embodiments thereof, it is evident that many alternatives, modifications, and variations will be apparent to those skilled in the art. For example, various components of the embodiments may be interchanged, added, or substituted in the other embodiments. Also, all of the elements of each figure are not necessary for operation of the disclosed embodiments. For example, one of ordinary skill in the art of the disclosed embodiments would be enabled to make and use the teachings of the disclosure by simply employing the elements of the independent claims. Accordingly, embodiments of the disclosure as set forth herein are intended to be illustrative, not limiting. Various changes may be made without departing from the spirit and scope of the disclosure.

In this document, relational terms such as "first," "second," and the like may be used solely to distinguish one entity or action from another entity or action without necessarily requiring or implying any actual such relationship or order between such entities or actions. The phrase "at least one of," "at least one selected from the group of," or "at least one selected from" followed by a list is defined to mean one, some, or all, but not necessarily all of, the elements in the list. The terms "comprises," "comprising," "including," or any other variation thereof, are intended to cover a non-exclusive inclusion, such that a process, method, article, or apparatus that comprises a list of elements does not include only those elements but may include other elements not expressly listed or inherent to such process, method, article, or apparatus. An element proceeded by "a," "an," or the like does not, without more constraints, preclude the existence of additional identical elements in the process, method, article, or apparatus that comprises the element. Also, the term "another" is defined as at least a second or more. The terms "including," "having," and the like, as used herein, are defined as "comprising." Furthermore, the background section is not admitted as prior art, is written as the inventor's own understanding of the context of some embodiments at the time of filing, and includes the inventor's own recognition of any problems with existing technologies and/or problems experienced in the inventor's own work.

We claim:

1. A method in a device, the method comprising:
   receiving a codebook subset restriction configuration from a network entity,
   wherein the codebook subset restriction configuration indicates a set of restricted beams, and
   wherein the codebook subset restriction configuration also indicates amplitude restriction values for each restricted beam in the set of restricted beams;
   receiving a set of reference signals from the network entity;
   defining a set of frequency domain coefficients, the set of frequency domain coefficients being an element of a discrete Fourier transform-compression codebook,
   wherein each frequency domain coefficient of the set of frequency domain coefficients corresponds to a beam, where a beam that has a frequency domain coefficient has at least one frequency domain coefficient,
   wherein each beam of the set of restricted beams corresponds to a function of an amplitude restriction ratio,
   wherein the function of the amplitude restriction ratio of each restricted beam is restricted to be less than or equal to an amplitude restriction value corresponding to the each restricted beam, and
   wherein the amplitude restriction ratio of each restricted beam is a ratio of a restricted beam metric corresponding to each restricted beam and a reference metric corresponding to each restricted beam,
   where the restricted beam metric is a function of frequency domain coefficients corresponding to only the corresponding restricted beam, and
   where the reference metric corresponding to each restricted beam is a function of at least a subset of frequency domain coefficients corresponding to beams other than the each restricted beam;
   generating the set of frequency domain coefficients based on at least the restriction of the function of the amplitude restriction ratio of each restricted beam in the set of restricted beams; and
   transmitting at least one channel state information report containing the set of frequency domain coefficients,
   wherein the reference metric corresponding to each restricted beam is a function of a set of beam powers of all beams other than the corresponding restricted beam, where a beam power of a beam is equal to a sum of a magnitude of a squared value of non-zero frequency domain coefficients of at least one beam.

2. The method according to claim 1, wherein the reference metric corresponding to each restricted beam is a function of a subset of the frequency domain coefficients corresponding to only beams other than the restricted beam.

3. The method according to claim 1, wherein the function of the amplitude restriction ratio is a square root of the amplitude restriction ratio.

4. The method according to claim 1, wherein the function of the amplitude restriction ratio is the amplitude restriction ratio itself.

5. The method according to claim 1, wherein the function of the set of beam powers is a maximum of the set of beam powers of beams other than the restricted beam in a given layer.

6. The method according to claim 1, wherein the function of the set of beam powers is a maximum of the set of beam powers of beams other than the restricted beam summed over all layers.

7. The method according to claim 1, wherein the function of the set of beam powers is a maximum of the set of beam powers of beams other than the restricted beam across all layers.

8. The method according to claim 1, wherein the beam power of a beam is equal to a sum of the magnitude of a squared value of non-zero frequency domain coefficients of a pair of beams.

9. An apparatus comprising:
   a transceiver that
      receives a codebook subset restriction configuration from a network entity, where the codebook subset restriction configuration indicates a set of restricted beams, and where the codebook subset restriction configuration also indicates amplitude restriction values for each restricted beam in the set of restricted beams, and
      receives a set of reference signals from the network entity; and
   a controller coupled to the transceiver, where the controller
      defines a set of frequency domain coefficients, the set of frequency domain coefficients being an element of a discrete Fourier transform-compression codebook,
      wherein each frequency domain coefficient of the set of frequency domain coefficients corresponds to a beam, where a beam that has a frequency domain coefficient has at least one frequency domain coefficient, wherein each beam of the set of restricted beams corresponds to a function of an amplitude restriction ratio, wherein the function of the amplitude restriction ratio of each restricted beam is restricted to be less than or equal to an amplitude restriction value corresponding to the each restricted beam, and wherein the amplitude restriction ratio of each restricted beam is a ratio of a restricted beam metric corresponding to each restricted beam and a reference metric corresponding to each restricted beam, where the restricted beam metric is a function of frequency domain coefficients corresponding to only the corresponding restricted beam, and where the reference metric corresponding to each restricted beam is a function of at least a subset of frequency domain coefficients corresponding to beams other than the each restricted beam, and generates the set of frequency domain coefficients based on at least the restriction of the function of the amplitude restriction ratio of each restricted beam in the set of restricted beams, wherein the transceiver transmits at least one channel state information report containing the set of frequency domain coefficients, and wherein the reference metric corresponding to each restricted beam is a function of a set of beam powers of all beams other than the corresponding restricted beam, where a beam power of a beam is equal to a sum of a magnitude of a squared value of non-zero frequency domain coefficients of at least one beam.

10. The apparatus according to claim 9, wherein the reference metric corresponding to each restricted beam is a function of a subset of the frequency domain coefficients corresponding to only beams other than the restricted beam.

11. The apparatus according to claim 9, wherein the function of the amplitude restriction ratio is a square root of the amplitude restriction ratio.

12. The apparatus according to claim 9, wherein the function of the amplitude restriction ratio is the amplitude restriction ratio itself.

13. The apparatus according to claim 9, wherein the function of the set of beam powers is a maximum of the set of beam powers of beams other than the restricted beam in a given layer.

14. The apparatus according to claim 9, wherein the function of the set of beam powers is a maximum of the set of beam powers of beams other than the restricted beam summed over all layers.

15. The apparatus according to claim 9, wherein the function of the set of beam powers is a maximum of the set of beam powers of beams other than the restricted beam across all layers.

16. The apparatus according to claim 9, wherein the beam power of a beam is equal to a sum of the magnitude of a squared value of non-zero frequency domain coefficients of a pair of beams.

* * * * *